(12) United States Patent
Engineer et al.

(10) Patent No.: US 9,305,028 B2
(45) Date of Patent: Apr. 5, 2016

(54) GAMING PLATFORM UTILIZING A FRAUD DETECTION PLATFORM

(71) Applicant: Zynga Inc., San Francisco, CA (US)

(72) Inventors: Sunu Engineer, Pune (IN); Prashun Purkayastha, Bangalore (IN); Anandamoy Roychowdhary, Pune (IN)

(73) Assignee: Zynga Inc., San Francisco, CA (US)

( * ) Notice: Subject to any disclaimer, the term of this patent is extended or adjusted under 35 U.S.C. 154(b) by 239 days.

(21) Appl. No.: 13/860,702

(22) Filed: Apr. 11, 2013

(65) Prior Publication Data

US 2013/0296039 A1    Nov. 7, 2013

(30) Foreign Application Priority Data

Apr. 11, 2012    (IN) ............................ 1107/DEL/2012

(51) Int. Cl.
*A63F 13/12* (2006.01)
*G06F 17/30* (2006.01)
*A63F 13/30* (2014.01)

(52) U.S. Cl.
CPC .......... *G06F 17/30283* (2013.01); *A63F 13/12* (2013.01); *A63F 2300/552* (2013.01); *A63F 2300/556* (2013.01); *A63F 2300/5533* (2013.01); *A63F 2300/5586* (2013.01); *A63F 2300/572* (2013.01)

(58) Field of Classification Search
USPC ........................................................... 463/29
See application file for complete search history.

(56) References Cited

U.S. PATENT DOCUMENTS

| | | | |
|---|---|---|---|
| 9,028,329 B2 * | 5/2015 | Graham .................. | G07F 17/32 463/31 |
| 2012/0049455 A1 * | 3/2012 | Yap ........................ | G07F 17/322 273/274 |
| 2012/0172133 A1 * | 7/2012 | Trexler ............... | G07F 17/3227 463/42 |
| 2015/0213683 A1 * | 7/2015 | Graham .................. | G07F 17/32 463/25 |

* cited by examiner

*Primary Examiner* — Pierre E Elisca
(74) *Attorney, Agent, or Firm* — Schwegman Lundberg & Woessner, P.A.

(57) ABSTRACT

A system, computer-readable storage medium storing at least one program, and a computer-implemented method for detecting fraud in a social gaming environment is disclosed herein. For example, game events generated responsive to a player playing a game executing on a client device are received. The game events may then be used to build a player profile for the player. The player profile may characterize the game actions performed by the player. The player profile is then compared with a golden profile. The golden profile may specify an expected gaming behavior. Based on the comparison between the player profile and the expected gaming behavior specified by the golden profile, a player account associated with the player may be marked as suspicious.

20 Claims, 9 Drawing Sheets

GAMING PLATFORM UTILIZING A FRAUD DETECTION PLATFORM

CLAIM TO PRIORITY

This application claims the benefit of priority under 35 U.S.C. §119 of Indian Provisional Patent Application, Serial Number 1107/DEL/2012, entitled "GAMING PLATFORM UTILIZING A FRAUD DETECTION PLATFORM," filed on Apr. 11, 2012, which is incorporated by reference herein in its entirety.

TECHNICAL FIELD

The present disclosure relates to gaming systems. In an example embodiment, a gaming platform is configured to detect fraudulent game play.

BACKGROUND

A recent trend in gaming is to make a game accessible to one or more users (e.g., players) by hosting the game online on a game server and distributing some portions of the game logic to client devices. Although some portions of the game logic that simulate the game actions of the game are distributed to the client devices, game logic that simulates the game actions of the game still operates on the game server. For example, in the course of playing a game, the game operations are first performed by the client device to effectuate the game play local to the client device and then performed again by the game server to prevent cheating and the like. Thus, the client devices and game servers in traditional systems execute the same game logic for each game action initiated by the users of the games.

Although the game logic executing on the game server and the client device may be conceptually the same, the game logic operating on the client device is typically written in one programming language, while the game logic operating on the game server is written in another. Thus, traditional game developers generally maintain separate development branches for the code to run on the game server and for the code to run on the client device.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
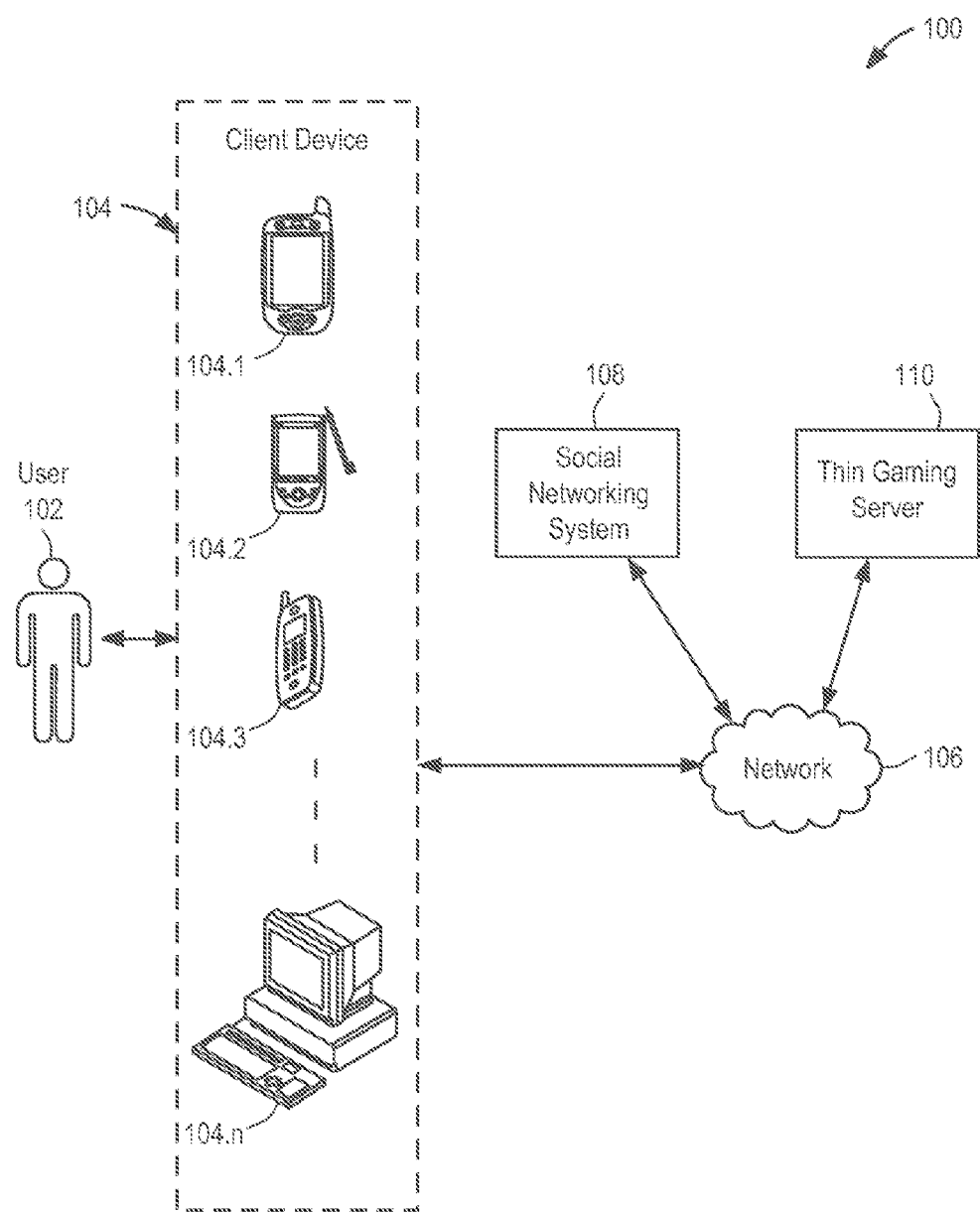
FIG. 1 illustrates an example of a gaming environment for implementing various example embodiments.

Users of computer-implemented systems may access and interact with a gaming environment. For example, a user (e.g., a player) may operate a client device to access a game instance supported at least in part by a thin gaming server. Consistent with embodiments described herein, the gaming environment may include a thin gaming server configured to operate in a client trusted mode. In the client trusted mode, the game specific operations of a game are performed by client modules operating on the client devices. For example, when a game action is initiated by the client module operating on a client device (e.g., a mobile phone, desktop, or any other suitable computer device), the client module may update the game state stored locally on a client device.

In some embodiments, utilizing a gaming environment that includes a thin gaming server may simplify game development, as compared to game development for traditional gaming environments. Such is the case because, to detect fraudulent gameplay, traditional gaming environments generally simulate game actions not only on the client side application but also on the game server. However, compared to such traditional gaming environments, example embodiments of the thin gaming server may operate absent game logic on the gamer server for simulating the game actions initiated by the client module.

Further, the thin gaming server, according to some embodiments, may provide a comparatively simpler data path. For example, in some embodiments, the thin gaming server performs basic data validation and does not replay the simulation. This data path may allow generic performance improvements without significant game logic.

With respect to fraud detection, a gaming environment may utilize a model based behavior analysis to identify fraudulent behavior. The model based behavior analysis may involve building up a golden profile to detect whether a computer program is playing on behalf of a player, game events or game logic resident on the client device has been tampered with, and/or a fraudulent member profile is being used. Such fraud detection may be performed by a separate system that can be customized to adopt different methods for fraud detection.

In an example embodiment, a computer-implemented method may be used to detect fraudulent game play. The method may begin when game events generated responsive to a player playing a game executing on a client device. The game events may then be used to build a player profile for the player. The player profile may characterize the game actions performed by the player. The method may then compare the player profile with a golden profile. The golden profile may specify an expected gaming behavior. Based on the comparison between the player profile and the expected gaming behavior specified by the golden profile, the method may mark a player account associated with the player as suspicious.

In an example embodiment, a system may be configured to detect fraudulent game play. The system may be configured to receive game events generated responsive to a player playing a game executing on a client device. The system may then use the game events to build a player profile for the player. As discussed above, the player profile may characterize the game actions performed by the player. The system may then compare the player profile with a golden profile. The golden profile may specify an expected gaming behavior. Based on the comparison between the player profile and the expected gaming behavior specified by the golden profile, the system may mark a player account associated with the player as suspicious.

These and other embodiments of the invention are described, by way of example, in further detail below.

Example System

FIG. 1 illustrates an example of a gaming environment 100 for implementing various example embodiments. In some embodiments, the gaming environment 100 comprises a user 102, a client device 104, a network 106, a social networking system 108, and a thin gaming server 110. The components of the gaming environment 100 may be connected directly or over the network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108, the thin gaming server 110, and the network 106, this disclosure includes any suitable arrangement or configuration of the user 102, the client device 104, the social networking system 108, the thin gaming server 110, and the network 106.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108 or the thin gaming server 110 directly, via the network 106, or via a third-party system. For example, the client device 104 may access the thin gaming server 110 via the social networking system 108.

The social networking system 108 may include a network-addressable computing system that can host one or more social graphs (see for example FIG. 2), and may be accessed by the other components of system 100 either directly or via the network 106. The social networking system 108 may generate, store, receive, and transmit social networking data.

Figure 2:
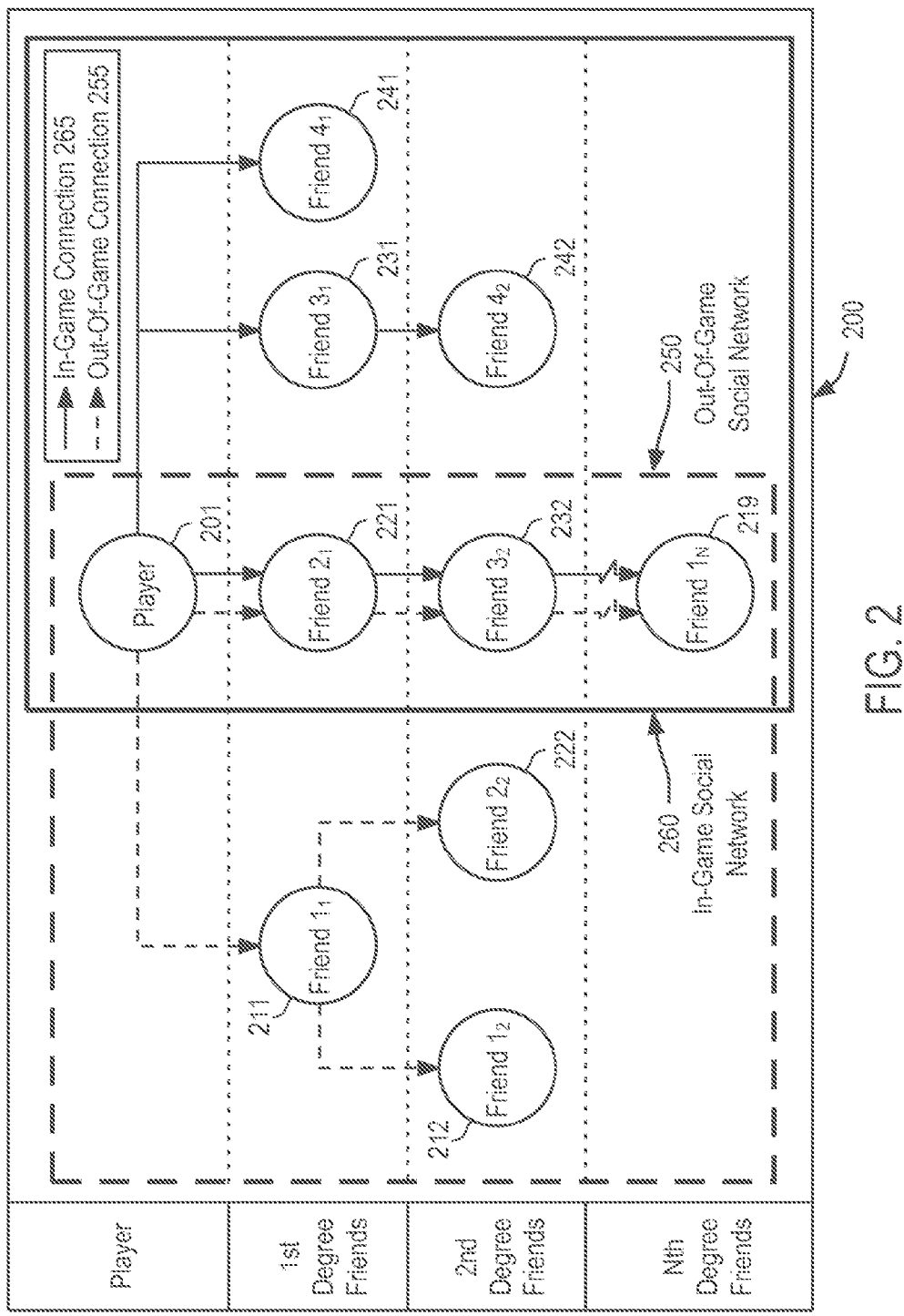
FIG. 2 is an example of a social network within a social graph, according to some embodiments.

FIG. 2 shows an example of a social network within a social graph 200. Social graph 200 is shown by way of example to include an out-of-game social network 250, and an in-game social network 260. Moreover, in-game social network 260 may include one or more users that are friends with Player 201 (e.g., Friend 231), and may include one or more other users that are not friends with Player 201. The social graph 200 may correspond to the various users associated with the virtual game.

With reference back to FIG. 1, the thin gaming server 110 may include a network-addressable computing system (or systems) that can host one or more games, for example online games. The thin gaming server 110 may also receive game events from the client device 104. The game events may include, for example, game account data, game input, and game state data. The thin gaming server 110 may be accessed by the other components of system 100 either directly or via the network 106. The user 102 may use the client device 104 to access, send data to, and receive data from the social networking system 108 and/or the thin gaming server 110.

Figure 3:
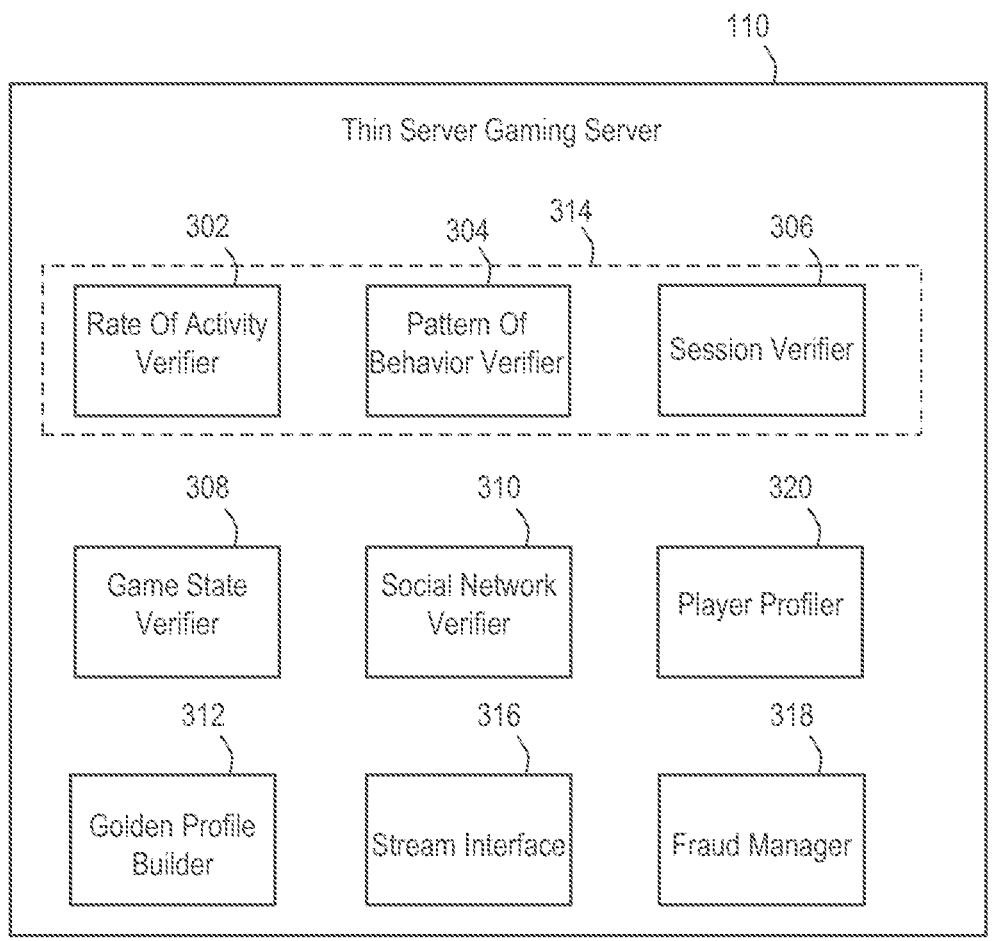
FIG. 3 is a block diagram showing various modules of the thin gaming server of FIG. 1, according to some embodiments.

FIG. 3 is a block diagram showing various modules of the thin gaming server 110 of FIG. 1, according to various embodiments. As shown by FIG. 3, the thin gaming server 110 includes an automata verifier 314, a game state verifier 308, a social networking verifier 310, a player profiler 320, a golden profile builder 312, a stream interface 316, and a fraud manager 318.

The automata verifier 314 may be configured to analyze a stream of game events to determine whether a player is playing through a proxy or autonomous gaming program that performs a number of game actions on behalf of the player. Such a determination may be accomplished using one or more verifiers that each considers one or more aspects of the game events. For example, as shown in FIG. 3, the automata verifier 314 includes a rate of activity verifier 302, a pattern of behavior verifier 304, and a session verifier 306. The rate of activity verifier 302 may be configured to measure the likelihood that a game event stream was generated by an autonomous gaming program based on the rate or frequency of the game actions of the game event stream. For example, a player's account may have generated a game event stream that includes, in some parts, X game actions per second. The rate of activity verifier 302 may then compare the X game actions per second to a golden profile to determine if the X game actions per second are outside the range of expected behavior for a human player. If yes, the rate of activity verifier 302 may mark the player account as suspicious. If not, the rate of activity verifier 302 does not mark the player profile as suspicious.

The pattern of behavior verifier 304 may be configured to measure the likelihood that a game event stream was generated by an autonomous gaming program based on a pattern of game actions found in a game event stream. The pattern of behavior verifier 304 may analyze a game event stream to determine whether the randomness of the game actions (e.g., the timing or sequence of game actions) matches the degree of randomness expected of a human player, as may be expressed in the golden profile. A rigid sequence or perfect timing of certain game actions may indicate that an autonomous gaming program is playing a game hosted by the thin gaming server 110.

The session verifier 306 may be configured to measure the likelihood that a game event stream was generated by an autonomous gaming program based on attributes of a session. For example, the session verifier 306 may mark a player profile as suspicious based on the length of a game session. In some cases, one or more long sessions (e.g., as may be measured by time) may indicate that autonomous gaming program is playing on behalf of a player because most social games are developed to support multiple short gaming sessions over the course of a day. That is, long sessions with a long number of game actions may represent an atypical gaming session that is likely being performed by an automata (e.g., an autonomous gaming program).

Thus, the automata verifier 314 may be used to calculate a score predicting the likelihood that a game is played by an automata based on the following factors: a rate of game activity, a pattern of game actions, a period of time per session, or an interval time between sessions.

FIG. 3 shows that the thin gaming server 110 may further include the game state verifier 308. The game state verifier 308 may be configured to measure the likelihood that a game event stream was generated by game logic or game events that has been tampered by a fraudster. For example, the game state verifier 308 may verify that some game attributes are within certain thresholds, as may be specified by a golden profile. For example, the game state verifier 308 may verify that experience points, energy, currency, game objects are within a certain threshold or, in some cases, the rate of change (increase or decrease) of these attributes is within an expected level specified by the golden profile. In this way, the game state verifier 308 may verify that certain game attributes, as may be stored on the client device, are not being fraudulently manipulated by the user. Such fraudulent manipulations may occur when the player hacks into the local game storage to tamper or otherwise alter the game state stored by the client device, or when the player utilizes an altered gaming module running on the client device 104. Game currency is an example of a game state that players may tamper with to gain an unearned advantage in the game.

The social networking verifier 310 may be configured to measure the likelihood that a player is utilizing shell user accounts to receive a game advantage. A "shell user account," as used herein, may refer to user accounts in the gaming environment (e.g., the thin gaming server 110 or the social networking system 108) that form game relationships with each other but are owned or otherwise created by the same player in the gaming environment. To illustrate, in some games, a player receives an in-game benefit when another player performs a game action involving a game asset, game board, or game account belonging to the player. Neighbor visits, gifting, messaging, and the like are example of gaming actions involving other players that may result in the player receiving an in-game benefit. The social networking verifier 310 may analyze the user accounts that a player interacts with to determine whether the user accounts are suspicious (e.g., shell accounts). A user account may be suspicious if the user account is connected only to the player, or a limited number of players relative to a social connection threshold. A user account may also be suspicious if the user account has limited social activities associated with the user account (e.g., messaging, updates, photos, and the like) relative to a social activity threshold. In some embodiments, the social networking verifier 310 may use a shell account profile to specify the properties that are common to a shell user account, as just described above.

The player profiler 320 may be configured to generate a player profile based on game events generated from a particular game. The player profile is then used to verify whether the player is suspicious, based on a comparison with a golden profile. As discussed in greater detail below, the player profiles generated and maintained by the player profiler 320 may include any number of the game events described above. For example, a player profile may include a rate of activity, a pattern of behavior, session data, game state data, social network data, and the like.

The golden profile builder 312 may be configured to generate a golden profile based on the game events received from a plurality of players. As used herein, the term "golden profile" may be a model of gaming behavior that represents an expected range of behavior by a human player using permissible game actions. As is described below, the measurement of the likelihood that a player engaging in impermissible game behavior may be determined based on a comparison of the player profile for that player generated by the player profiler 320 and the golden profile generated by the golden profile builder 312. Generating the golden profile is described in greater detail below with reference to FIG. 4.

The stream interface 316 may be a computer-implemented module configured to receive game events from one or more players. The stream interface 316 may obtain the game events from the various components of FIG. 1 through the network 106 using any known communication protocol, such as HTTP.

The fraud manager 318 may be configured to coordinate the fraud detection modules (e.g., the automata verifier 314, the game state verifier 308, and social network verifier 310). In some embodiments, upon detection of fraud by one of the fraud detection modules (e.g., the automata verifier 314, the game state verifier 308, and the social network verifier 310), the fraud manager 318 may tag a member player account as being suspicious and then take appropriate actions, as may be configured by a game developer of a game that connects with the fraud manager 318.

Figure 4:
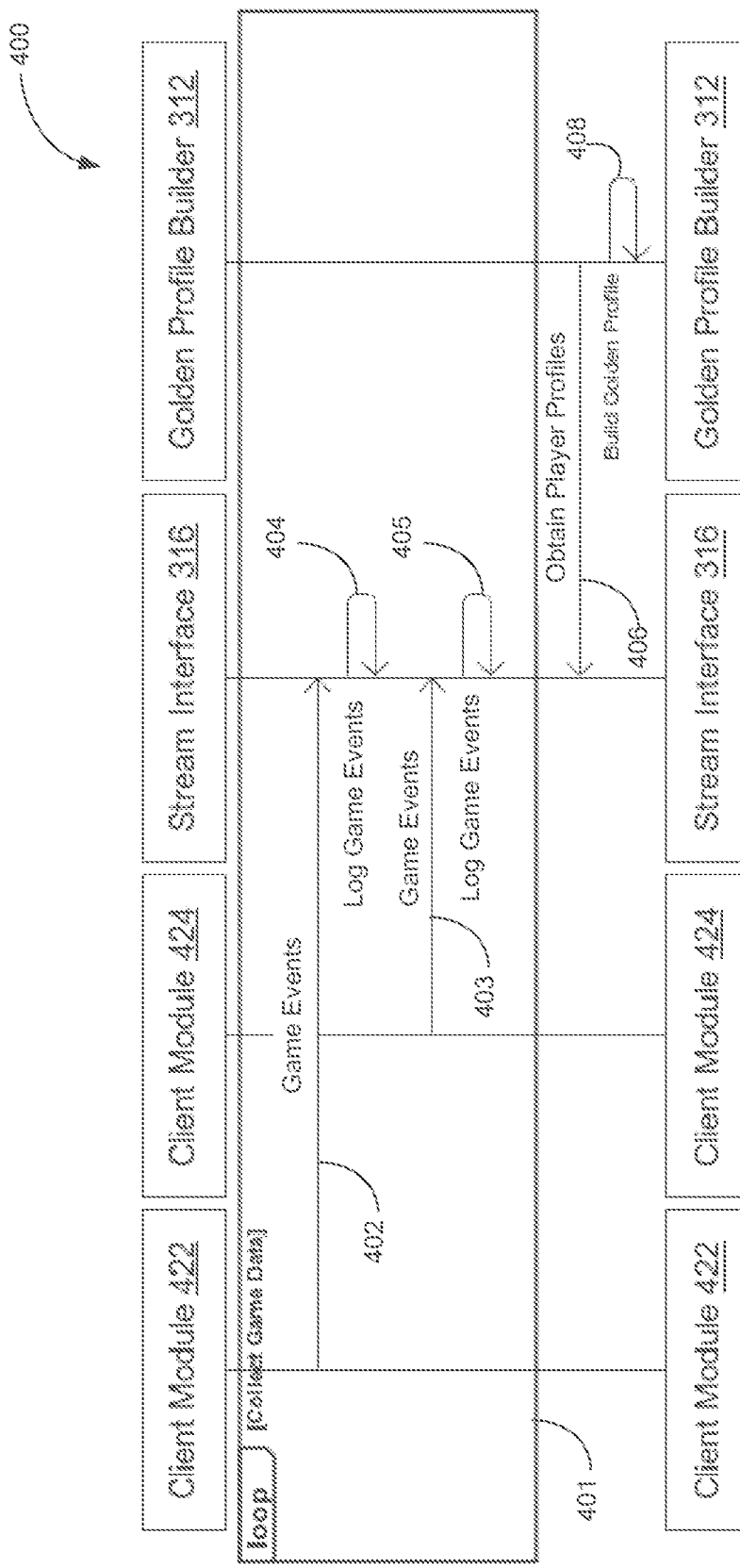
FIG. 4 is a sequence diagram illustrating the operations of a method of generating the golden profile, according to some embodiments.

FIG. 4 is a sequence diagram illustrating the operations of a method 400 of generating the golden profile, according to example embodiments. As FIG. 4 shows, execution of the method 400 involves a number of components described with respect to FIGS. 1-3, such as the stream interface 316 and the golden profile builder 312 of FIG. 3. Further, it is to be appreciated that FIG. 4 may additionally involve any of the other components of the gaming environment 100 illustrated in FIG. 1. The client modules 422, 424 may be client-side game modules running on separate client device (e.g., one client module may be running on the client device 104 in FIG. 1 and the other client module may be running on another client device) that provides client-side game logic. For example, in one embodiment, the client modules 422, 424 may be Action Script that performs the game logic that executes a virtual farming game. It is to be appreciated that for the purpose of clarity, FIG. 4 illustrates the method 400 according to the client module 422 being operated by one player and the client module 424 being operated by a different player.

In an example embodiment, the method 400 may begin with a game events collection loop 401 when the stream interface 316 obtains game events from one or more client modules. For example, FIG. 4 shows that the stream interface 316 may obtain game events from the client module 422, as shown as operation 402. Additionally, FIG. 4 shows that the stream interface 316 may obtain game events from the client module 424 at operation 403. The game events obtained by the stream interface 316 may include game events that include properties such as an operation identifier, time, user identifier, game identifier, and the like.

Once the stream interface 316 obtains the game events from the one or more client modules, the stream interface 316 may log or otherwise store the game events in player profiles respective to each of the client modules 422, 424. For example, when the stream interface 316 receives game events from the client module 422, the stream interface 316, at operation 404, may log the game events in a player profile associated with the user logged onto the client module 422. Additionally, at operation 405, the stream interface 316 (or, alternatively or additionally, the player profiler 320) may log the game events received at operation 403 with a gaming profile associated with the user logged onto the client module 422. Thus, the stream interface 316 may maintain individual player profiles that each correspond to one of a plurality of players.

As discussed above, the operations 402-405 may be repeated one or more times in the game events collection loop 401. Accordingly, each of the iterations of the game events collection loop 401 may obtain and log game events corresponding to different points in time. Thus, the game events obtained from the client modules 422, 424 over multiple iterations of the game events collection loop 401 may form a game events stream.

Figure 5:
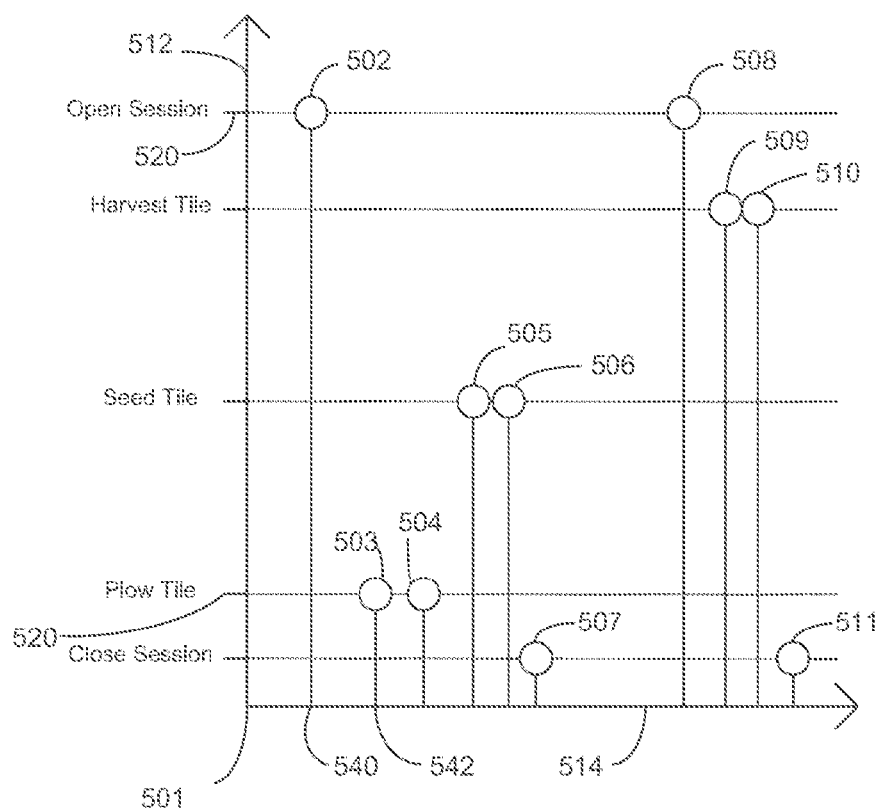
FIG. 5 is a diagram showing a simplified example of a game events stream associated with a particular client module, according to some embodiments.

FIG. 5 is a diagram showing a simplified example of a game events stream 500 associated with a particular client module, according to example embodiments. As shown in FIG. 5, the game events stream 500 may be conceptually represented by a game action graph 501, where a first axis 512 represents types of game action as a variable, and, further, a second axis 514 represents time as a variable.

The game action graph 501, as shown in FIG. 5, includes game action samples 502-511. Each game action sample may represent a particular type of game event generated by the client module (e.g., the client module 422 of FIG. 4) at a given time, as may be represent by the location of a game sample relative to the first axis 502 and relative to the second axis 504. Game action samples 302-511 are each associated with a particular game action type and a particular time. For example, the game action sample 502 corresponds to a game action type 520 that was generated at time 540. In comparison, the game action sample 503 corresponds to game action type 522 that was performed at time 542.

Accordingly, the game event samples 502-511 may include timing information (e.g., chronological order) for the game actions performed by a particular client module. For example, the game events stream may indicate that the client module 422 performed the following sequence of operations: create a game session (e.g., game events sample 502), plow two land tiles (e.g., game events samples 503, 504), seed the previously plowed land tiles (e.g., game events samples 505, 506), close the game session (e.g., game events sample 507), create another game session (e.g., game events sample 508), harvest the previously seeded land tiles (e.g., game events samples 509, 510), and then close the game session (e.g., game events sample 511).

From the game events samples 502-511, the gaming environment 100 may maintain any number of statistics. For example, according to an example embodiment, the player profiler 320 of FIG. 3 may maintain the statistical data regarding the time it takes a player to perform one game action (plant a seed) and then another game action (harvest the crop). In other embodiments, the player profiler 320 may maintain a statistical data regarding the sequence of game actions normally performed by a player, such as the sequence: plow, seed, and then harvest.

It is to be appreciated that the game events stream 500 shown in FIG. 5 is provided as an example and not a limitation. For example, the game events stream 500 may be represented in other forms, such as table, linked list, graph, or the like.

With reference back to FIG. 4, after the stream interface 316 logs the game events from the client modules 422, 424 generated from the corresponding player accounts (e.g., operations 404 and 405), the golden profile builder 312 may obtain the player profiles from the stream interface 316. This is shown as operation 406. In some embodiments, operation 406 may involve the golden profile builder 312 selecting particular player profiles. For example, the golden profile builder 312 may select a random set of player profiles when the game is initially launched by the game provider. Selecting the player profiles for the golden profile when the game is relatively new may be provide better results because it may be the case that players of a new game are less familiar with the techniques of cheating the game. That is, techniques for cheating a game are likely less known when a game is relatively new. In other embodiments, the golden profile builder 312 may select player profiles based on a random distribution. In yet other embodiments, the golden profile builder 312 may select player profiles of trusted players. A trusted player may be a player with a particular reputation score within the gaming platform, a player affiliated with the provider of the game (e.g., an employee or any other controlled agent of the game provider), or any other suitable player.

At operation 408, the golden profile builder 312 may then analyze the player profiles to build the golden profile. Building a golden profile may involve a comparison between two or more player profiles to identify reoccurring patterns in the player profiles. Such comparisons may involve the comparison between game events generated by the client modules as well as comparisons between the timing of those game events. Based on the comparisons between the player profiles, the golden profile builder 312 is able to generate a golden profile that includes data that indicates normal gaming behavior, such as typical game actions, typical streams of game actions, typical timing of game actions, and so forth.

Figure 6:
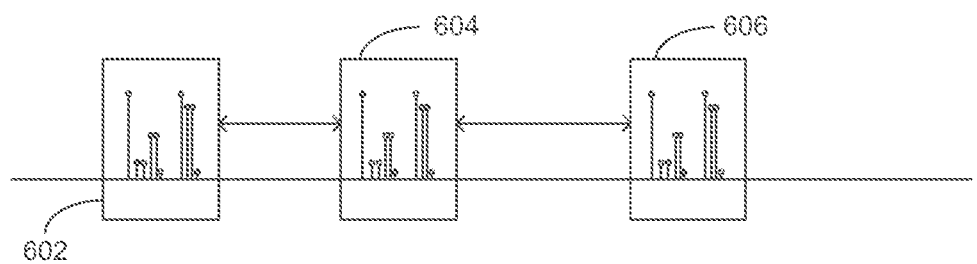
FIG. 6 is a diagram illustrating a simple example of a golden profile, according to example embodiments.

FIG. 6 is a diagram illustrating a simple example of a golden profile 600, according to example embodiments. The golden profile 600 includes gaming patterns 602, 604, 606. The term "gaming pattern," as used herein, may refer to any suitable sequence of game events that may be similarly repeated during the lifetime of a player playing a game. For example, the repeated pattern of creating a session, plowing a number of plots, seeding the plots, closing the session, opening another session, harvesting the plots, and then closing the second session may represent a gaming pattern is repeated a number of times during the lifecycle of a game. Accordingly, the gaming patterns 602, 604, 606 may be built by mathematically analyzing a game event stream to identify repeated gaming patterns. For example, FIG. 6 shows that the golden profile 600 has identified a repeating gaming pattern consisting of gaming patterns 602, 604, 606.

According to example embodiments, the golden profile 600 may include more or less information than a game event stream (e.g., see the game event stream 500 in FIG. 5). For example, in some embodiments, the golden profile 600 may include inter-gaming pattern timing information 622, 624, 626. The inter-gaming pattern timing information 622, 624, 626 may include information relating to the timing information that characterizes when a gaming pattern is repeated. For example, the golden profile 600 may include statistical information regarding the mean, median, variance time for a gaming pattern to repeat.

It is to be appreciated that the golden profile 600 shown in FIG. 6 is provided as an example and not a limitation. For example, the golden profile 600 may be represented in other forms, such as table, linked list, or the like. Further, the golden profile 600 may include gaming pattern type information, or any other suitable information.

Figure 7:
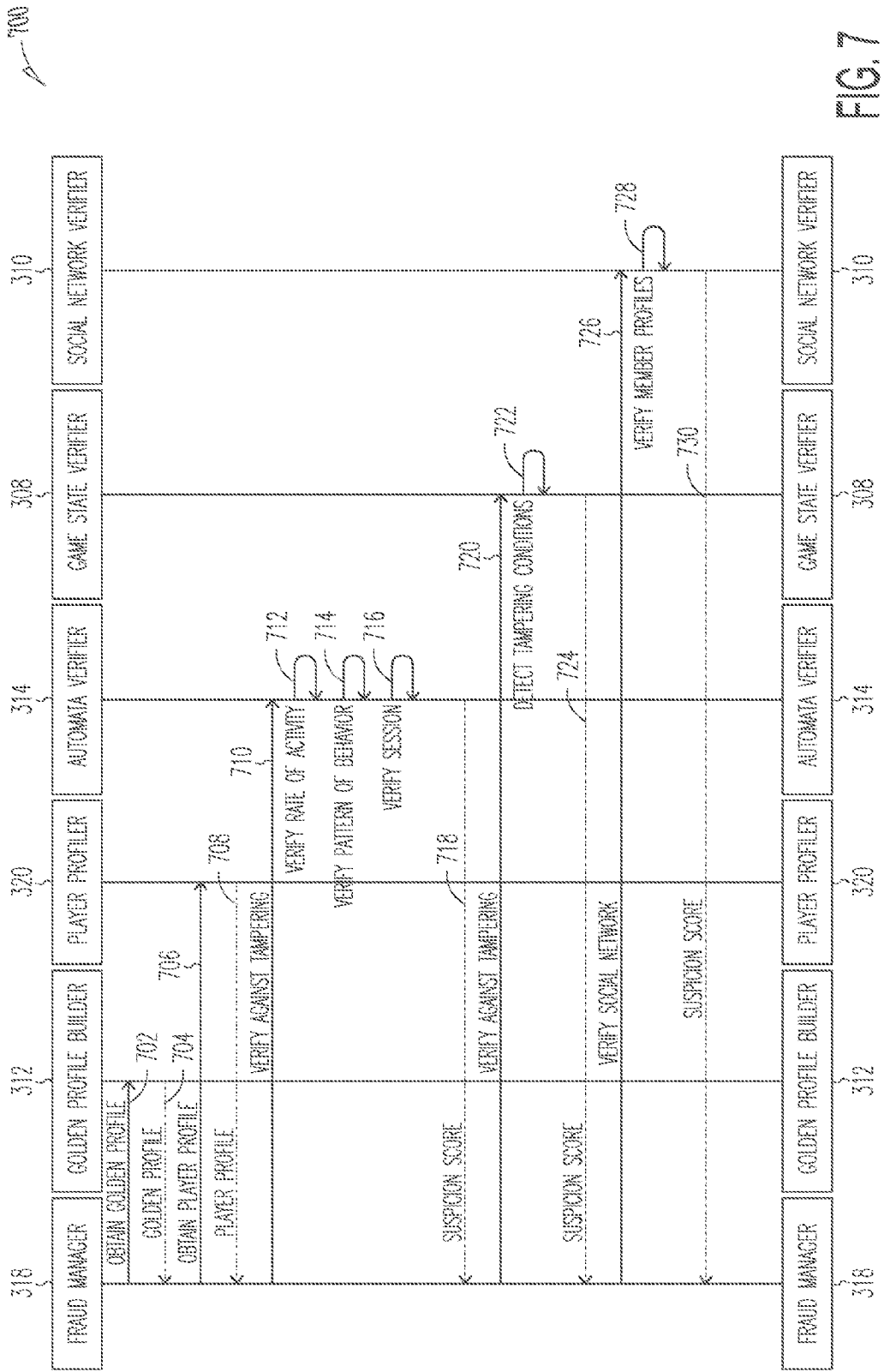
FIG. 7 is a sequence diagram illustrating operations performed to execute a method of verifying a player's game behavior, according to some embodiments.

FIG. 7 is a sequence diagram illustrating operations of a method 700 of verifying a player's game behavior, according to example embodiments. As FIG. 7 shows, execution of the method 700 involves a number of components described with respect to FIGS. 1-3, such as the fraud manager 318, golden profile builder 312, the automata verifier 314, the game state verifier 308, and the social network verifier 310. Further, it is to be appreciated that FIG. 7 may additionally involve any of the other components of the gaming environment 100 illustrated in FIG. 1, and modules included therein.

The method 700 may begin when the fraud manager 318 obtains a golden profile from the golden profile builder 312. Obtaining the golden profile is shown as operations 702, 704. As described above, the golden profile may be a model of expected gaming behavior. Such gaming behavior may identify relevant gaming patterns and other attributes associated with the typical performance of a legitimate player playing a game hosted on the gaming environment 100.

The method 700 may also involve the fraud manager 318 obtaining a player profile. This is shown as operations 706, 708. As described above, a player profile may include a game event stream that relates to game activity performed during the performance of a player playing a game hosted on the gaming environment 100.

Once the fraud manager 318 obtains the golden profile and the player profile, the fraud manager 318 may, beginning at operation 710, run a number of verifiers to mark whether the player account associated with the player profile is suspicious of being operated by an automata (e.g., a computer program) playing on behalf of a human player. For example, in an example embodiment, at operation 712, the automata verifier 314 may use the golden profile to verify the rate of activity exhibited by the player profile. Verifying the rate of activity exhibited by the player profile may include comparing the timing between gaming events specified by a player profile relative to the golden profile.

At operation 714, the automata verifier 314 may use the golden profile to verify the pattern of behavior specified by the player profile. By way of example and not limitation, verifying the pattern of behavior exhibited by the player profile may include comparing the sequence of game events in the player profile to the sequence of game events present in the golden profile. In other embodiments, operation 714 may involve comparing the timing of the game events in the player profile to the timing of game events present in the golden profile. For example, such a comparison of timing may involve determining the delay in performing a game action (e.g., harvesting a crop) compared to when the game action was available to be performed (e.g., when the crop was ready for harvest).

At operation 716, the automata verifier 314 may use the golden profile to verify the session behavior exhibited by the player profile. By way of example and not limitation, verifying, using the golden profile, the session behavior exhibited by the player profile may include comparing duration and frequency of the gaming sessions specified by the player profile. For example, game sessions that last over a threshold period of time (as may be determined by the golden profile) may indicate that computer program is playing on behalf of a player.

Responsive to the various verifiers, the automata verifier 314 may return a suspicion score to the fraud manager. This is shown as operation 718. The suspicion score may provide an indication as to what degree the player associated with the player profile is trusted within a game or across the games provided by the gaming system.

At operation 720, the fraud manager 318 may cause the game state verifier 308 to determine whether the player profile indicates whether the player has tampered the game events and game logic on the client side module.

At operation 722, the game state verifier 308 verifies whether the game state and game logic on the client device has been tampered with by the player. In some embodiments, operation 722 may involve the game state verifier 308 comparing the player profile with the golden profile. Such a comparison may measure the rate of growth of certain property of the game, such as an game energy, resource, asset, currency and the like stored in the player profile with the expected rate of growth shown in the golden profile. Further, in some embodiments, the operation 722 may involve the game state verifier 308 comparing the value of the certain properties of the game, such as in-game energy, resource, asset, currency, and the like, with game defined thresholds.

At operation 724, the game state verifier 308 returns a suspicion score to the fraud manager 318 that indicates the level of suspicion of the player based on an indication of whether the player has tampered with the game logic or game events.

At operation 726, the fraud manager 318 may request the social network verifier 310 to determine whether the player is utilizing fraudulent connections in a social network to obtain an advantage in the game hosted on the gaming environment 100.

At operation 728, the social network verifier 310 verifies the social network associated with the player. For example, the player profile may include game actions that involve interactions with other players within a social network. The social network verifier 310 may then determine whether the member accounts within the social network that correspond to the other players are proxy accounts (e.g., fake accounts set up by the player). In some embodiments, the social network verifier 310 may determine that a member account is fake by examining the connections, social interactions, photos, and other activities of the member account.

At operation 724, the social network verifier 310 may returns a suspicion score to the fraud manager 318 that indicates the level of suspicion of the player based on an indication that the player uses fake accounts in a social network.

In some embodiments, the fraud manager 318 may then aggregate the various suspicion scores (e.g., the suspicion scores received at operations 718, 724, and 730) to determine if the aggregated score is above a threshold value. In other embodiments, if any of the suspicion scores is above a threshold value (as may be a global value or a threshold value specific to the verifier). If the suspicion score is above the threshold value, the fraud manager 318 may mark the game account of the player as suspicious. In other embodiments, players are associated with a trust score, and the suspicion score may adjust the trust score.

Figure 8:
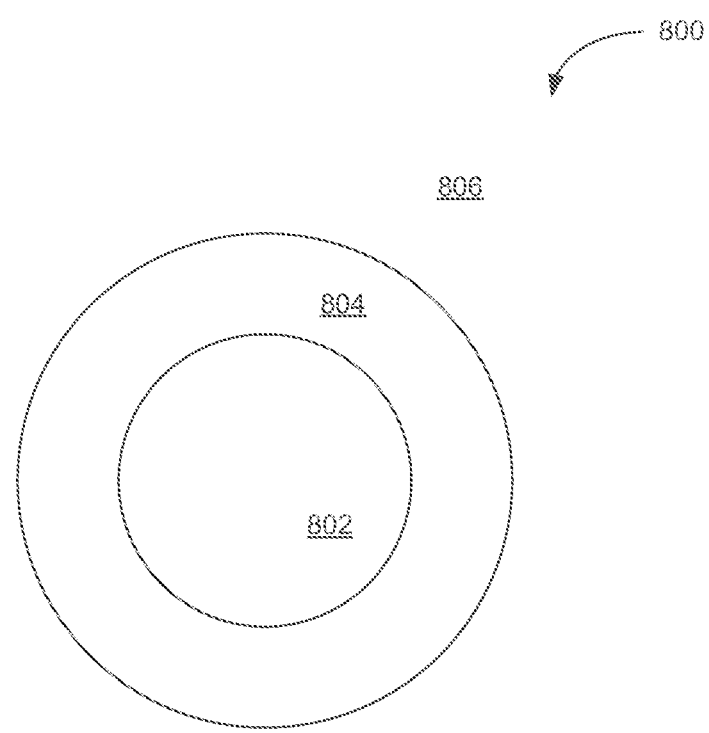
FIG. 8 is a diagram illustrating a simplified example of a suspicion threshold, according to some embodiments.

FIG. 8 is a diagram illustrating a simplified example of a suspicion threshold 800, according to example embodiments. The suspicion threshold 800, as depicted in FIG. 8, defines acceptable behavior according to a function. It is to be appreciated that the suspicion threshold 800 is provided merely as an example and not a limitation. Thus, although the suspicion threshold 800 is depicted as defining a two dimensional space, other embodiments may use more or less dimensions to define the acceptable range of behavior. As shown in FIG. 8, the suspicion threshold 800 may include a legitimate range 802, a questionable range 804, and in impermissible range 806. The legitimate range 802, the questionable range 804, and the impermissible range 806 may provide a measurement of the likelihood that a client module is performing fraudulent game activities. For example, based on the comparison of a player profile and the golden profile, if the suspicion score falls within the legitimate range 802, the suspicion score may indicate that the player account associated with the client module is sufficiently trustworthy. Further, based on the comparison of the player profile and the golden profile, a suspicion score that falls within the questionable range 804 may result in an indication that the player account associate with the client module may be fraudulent in some respect. Still further, based on the comparison of the player profile and the golden profile, a suspicion score that falls within the impermissible range 806 may result in the player account associated with the client module losing some ability to interact with a gaming system.

It is to be appreciated that according to some embodiments, the gaming environment 100 may be configured to enforce specified policies in response to the suspicion score falling with a certain score with the suspicion threshold 800. For example, one such policy may be to send a notification (e.g., an email or in-game message) to the player. Further, it is to be appreciated that a suspicion score may affect the player's ability to interact with the gaming environment. Such an impact may be specific to a game or across game provided by the gaming environment. One example of affecting the player's ability to interact with the game includes banning the player from playing one or more of the games. Another example of affecting the player's ability to interact with the game environment is to limit the number of game actions a player may play within a certain time period.

Example Game Systems, Social Networks, and Social Graphs

As described above, the systems described herein may include, communicate, or otherwise interact with a game system. As such, a game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users. A game engine, in some embodiments, may include a documentation engine. Alternatively, the documentation engine and game engine may be embodied as separate components operated by the game network system and/or the document provision system.

A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc. depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends, User, B, and User B's friends could all be offline or inactive). In some embodiments, the friends in a user's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 106 with a suitable client device 104. A user may have a game account on the game networking system 108.2, wherein the game account may contain a variety of information associated with the user (e.g., the user's personal information, financial information, purchase history, player character state, game state, etc.). In some embodiments, a user may play multiple games on the game networking system 108.2, which may maintain a single game account for the user with respect to the multiple games, or multiple individual game accounts for each game with respect to the user. In some embodiments, the game networking system 108.2 may assign a unique identifier to a user 102 of a virtual game hosted on the game networking system 108.2. The game networking system 108.2 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and control the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the game networking system 108.2.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are profiles of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the user 102 has a social network on both the game networking system 108.2 and the social networking system 108.1, wherein the user 102 can have a social network on the game networking system 108.2 that is a subset, superset, or independent of the user's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser game system or social networking system. As used herein, the term "friend" can mean any node within a user's social network.

As shown in FIG. 2, User 201 has direct connections with several friends. When User 201 has a direct connection with another individual, that connection is referred to as a first-degree friend. In out-of-game social network 250, User 201 has two first-degree friends. That is, User 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a user to another user is considered the degree of separation. For example, FIG. 2 shows that User 201 has three second-degree friends to which User 201 is connected via User 201's connection to User 201's first-degree friends. Second-degree Friend $1_2$ 212 and Friend $2_2$ 222 are connected to User 201 via User 201's first-degree Friend $1_1$ 211. The limit on the depth of friend connections, or the number of degrees of separation for associations, that User 201 is allowed is typically dictated by the restrictions and policies implemented by the social networking system 108.1.

In various embodiments, User 201 can have Nth-degree friends connected to him through a chain of intermediary degree friends as indicated in FIG. 2. For example, Nth-degree Friend $1_N$ 219 is connected to User 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, User 201 has out-of-game connections 255 to a plurality of friends, forming out-of-game social network 250. Here, Friend $1_1$ 211 and Friend $2_1$ 221 are first-degree friends with User 201 in User 201's out-of-game social network 250. User 201 also has in-game connections 265 to a plurality of users, forming in-game social network 260. Here, Friend $2_1$ 221, Friend $3_1$ 231, and Friend $4_1$ 241 are first-degree friends with User 201 in User 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

Figure 9:
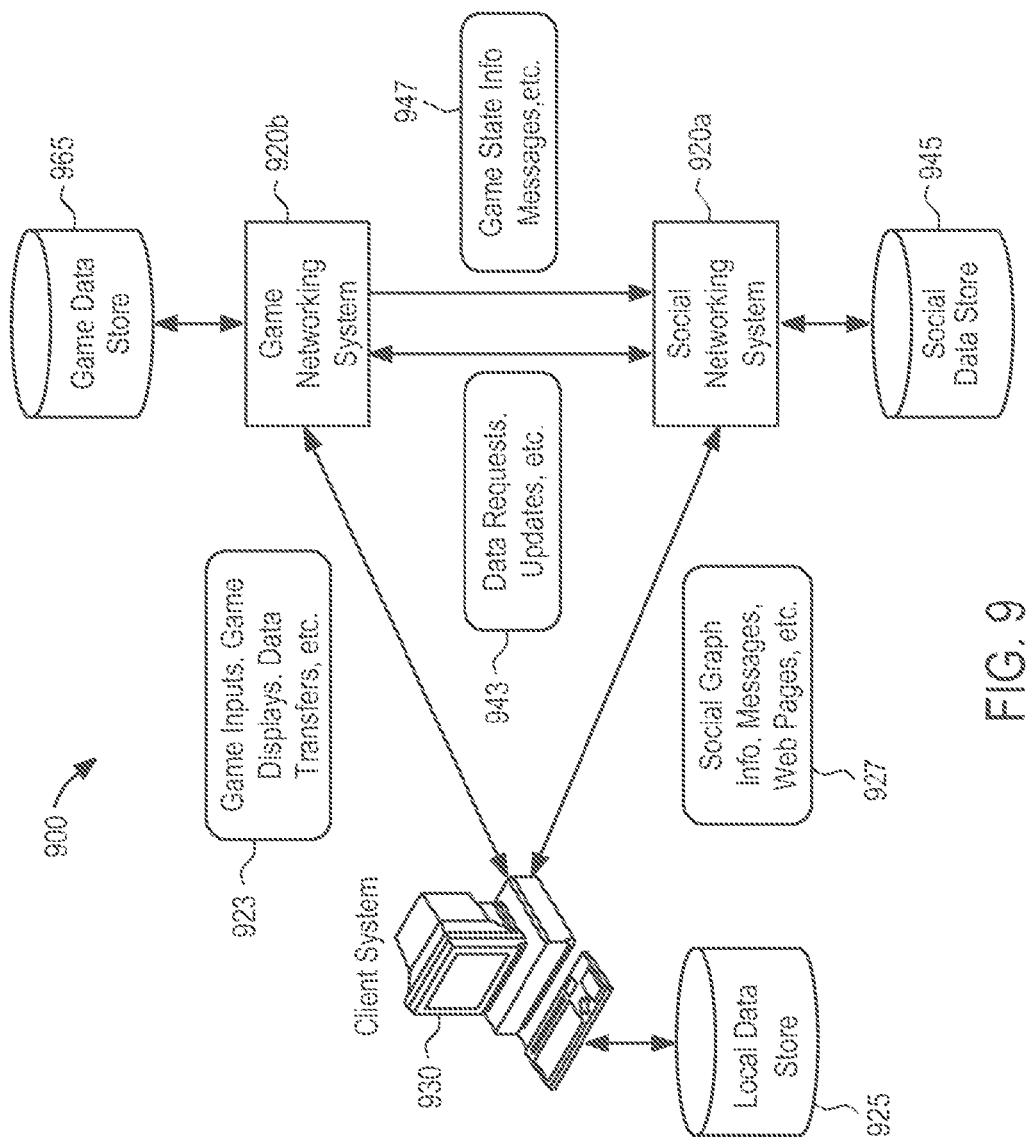
FIG. 9 illustrates an example data flow between example components of the example system of FIG. 1, according to some embodiments.

FIG. 9 illustrates an example data flow between example components of an example system 900. One or more of the components of the example system 900 may correspond to one or more of the components of the example system 100. In some embodiments, system 900 includes a client system 930, a social networking system 920a, and a game networking system 920b. The components of system 900 can be connected to each other in any suitable configuration, using any suitable type of connection. The components may be connected directly or over any suitable network. The client system 930, the social networking system 920a, and the game networking system 920b may have one or more corresponding data stores such as the local data store 925, the social data store 945, and the game events store 965, respectively.

The client system 930 may receive and transmit data 923 to and from the game networking system 920b. This data can include, for example, a web page, a message, a game input, a game display, a HTTP packet, a data request, transaction information, and other suitable data. At some other time, or at the same time, the game networking system 920b may communicate data 943, 947 (e.g., game state information, game system account information, page info, messages, data requests, updates, etc.) with other networking systems, such as the social networking system 920a (e.g., Facebook, Myspace, etc.). The client system 930 can also receive and transmit data 927 to and from the social networking system 920a. This data can include, for example, web pages, messages, social graph information, social network displays, HTTP packets, data requests, transaction information, updates, and other suitable data.

Communication between the client system 930, the social networking system 920a, and the game networking system 920b can occur over any appropriate electronic communication medium or network using any suitable communications protocols. For example, the client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 920b, the BLOB containing the game state for the instance corresponding to the user may be transmitted to the client system 930 for use by a client-side executed object to process. In some embodiments, the client-side executable is a FLASH-based game, which can de-serialize the game state data in the BLOB. As a user plays the game, the game logic implemented at the client system 930 maintains and modifies the various game state parameters locally. The client-side game logic may also batch game events, such as mouse clicks, and transmit these events to the game networking system 920b. Game networking system 920b may itself operate by retrieving a copy of the BLOB from a database or an intermediate memory cache (memcache) layer. The game networking system 920b can also de-serialize the BLOB to resolve the game state parameters and execute its own game logic based on the events in the batch file of events transmitted by the client to synchronize the game state on the server side. The game networking system 920b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 930. For example, a client application downloaded to the client system 930 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 920a. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 930, either caused by an action of a game user or by the game logic itself, the client system 930 may need to inform the game networking system 920b of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 930 may include a Flash client. The Flash client may be configured to receive and run Flash application or game object code from any suitable networking system (such as, for example, the social networking system 920a or the game networking system 920b). In some embodiments, the Flash client is run in a browser client executed on the client system 930. A user can interact with Flash objects using the client system 930 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 930, the Flash client may send the events that caused the game state changes to the in-game object to the game networking system 920b. However, to expedite the processing and hence the speed of the overall gaming experience, the Flash client may collect a batch of some number of events or updates into a batch file. The number of events or updates may be determined by the Flash client dynamically or determined by the game networking system 920b based on server loads or other factors. For example, client system 930 may send a batch file to the game networking system 920b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 930, the game networking system 920b serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 920b may retrieve the corresponding BLOB from the database to determine the most-recent values of the game-related data. In some embodiments, while a user is playing the virtual game, the game networking system 920b also loads the corresponding BLOB into a memory cache so that the game system may have faster access to the BLOB and the game-related data contained therein.

Figure 10:
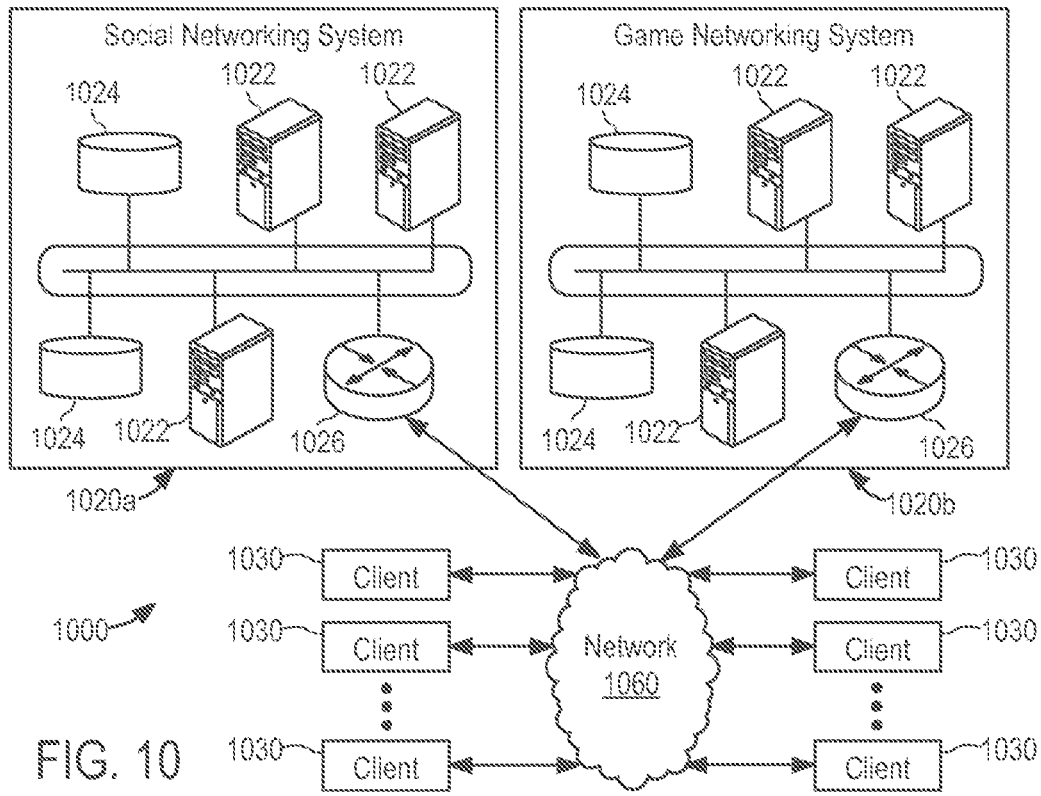
FIG. 10 illustrates an example network environment, in which various example embodiments may operate.

Various embodiments may operate in a wide area network environment, such as the Internet, including multiple network addressable systems. FIG. 9 illustrates an example network environment 1000, in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 10 illustrates, various embodiments may operate in a network environment 1000 comprising one or more networking systems, such as a social networking system 1020a, a game networking system 1020b, and one or more client systems 1030. The components of the social networking system 1020a and the game networking system 1020b operate analogously; as such, hereinafter they may be referred to simply as the networking system 1020. The client systems 1030 are operably connected to the network environment 1000 via a network service provider, a wireless carrier, or any other suitable means.

The networking system 1020 is a network addressable system that, in various example embodiments, comprises one or more physical servers 1022 and data stores 1024. The one or more physical servers 1022 are operably connected to computer network cloud 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1022 may host functionality directed to the operations of the networking system 1020. Hereinafter servers 1022 may be referred to as server 1022, although the server 1022 may include numerous servers hosting, for example, the networking system 1020, as well as other content distribution servers, data stores, and databases. Data store 1024 may store content and data relating to, and enabling, operation of, the networking system 1020 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In some embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

The client system 1030 is generally a computer or computing device including functionality for communicating (e.g., remotely) over a computer network. The client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a Web browser.

When a user at a client system 1030 desires to view a particular webpage (hereinafter also referred to as target structured document) hosted by the networking system 1020, the user's web browser, or other document rendering engine or suitable client application, formulates and transmits a request to the networking system 1020. The request generally includes a URL or other document identifier as well as metadata or other information. By way of example, the request may include information identifying the user, a timestamp identifying when the request was transmitted, and/or location information identifying a geographic location of the user's client system 1030 or a logical network location of the user's client system 1030.

Although the example network environment 1000 described above and illustrated in FIG. 10 is described with respect to the social networking system 1020a and the game networking system 1020b, this disclosure encompasses any suitable network environment using any suitable systems. For example, a network environment may include online media systems, online reviewing systems, online search engines, online advertising systems, or any combination of two or more such systems.

Figure 11:
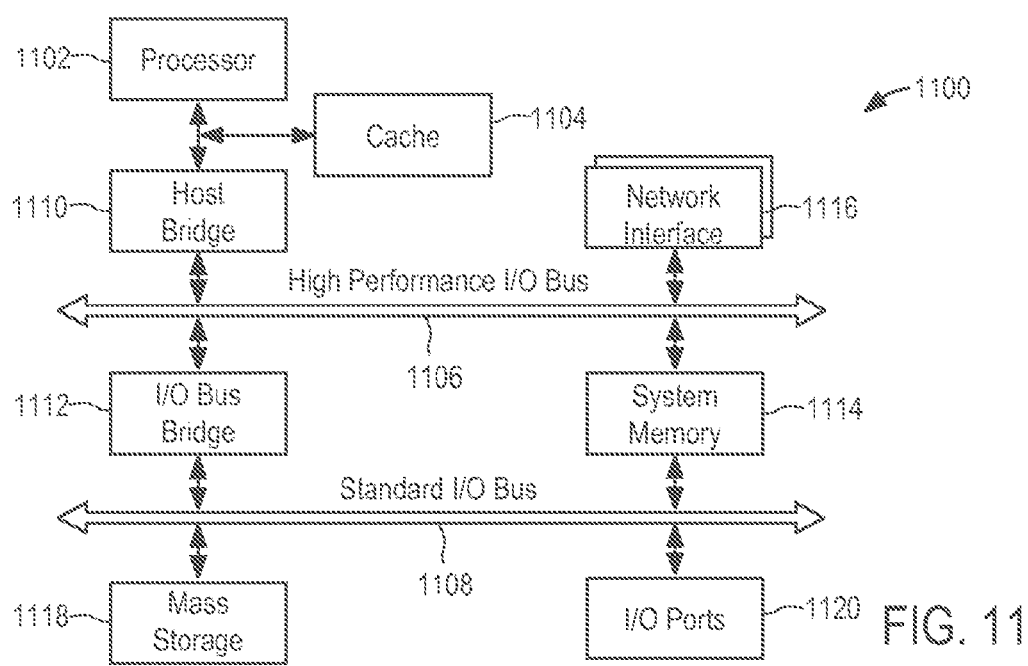
FIG. 11 illustrates an example computing system architecture, which may be used to implement one or more of the methodologies described herein, according to some embodiments.

FIG. 11 is illustrates an example computing system architecture, which may be used to implement a server 1022 or a client system 1030. In one embodiment, the hardware system 1100 comprises a processor 1102, a cache memory 1104, and one or more executable modules and drivers, stored on a tangible computer-readable storage medium, directed to the functions described herein. Additionally, the hardware system 1100 may include a high performance input/output (I/O) bus 1106 and a standard I/O bus 1108. A host bridge 1110 may couple the processor 1102 to the high performance I/O bus 1106, whereas the I/O bus bridge 1112 couples the two buses 1106 and 1108 to each other. A system memory 1114 and one or more network/communication interfaces 1116 may couple to the bus 1106. The hardware system 1100 may further include video memory (not shown) and a display device coupled to the video memory. Mass storage 1118 and I/O ports 1120 may couple to the bus 1108. The hardware system 1100 may optionally include a keyboard, a pointing device, and a display device (not shown) coupled to the bus 1108. Collectively, these elements are intended to represent a broad category of computer hardware systems.

The elements of the hardware system 1100 are described in greater detail below. In particular, the network interface 1116 provides communication between the hardware system 1100 and any of a wide range of networks, such as an Ethernet (e.g., IEEE 802.3) network, a backplane, etc. The mass storage 1118 provides permanent storage for the data and programming instructions to perform the above-described functions implemented in servers 1022 of FIG. 10, whereas system memory 1114 (e.g., DRAM) provides temporary storage for the data and programming instructions when executed by the processor 1102. I/O ports 1120 are one or more serial and/or parallel communication ports that provide communication between additional peripheral devices, which may be coupled to the hardware system 1100.

The hardware system 1100 may include a variety of system architectures and various components of the hardware system 1100 may be rearranged. For example, cache memory 1104 may be on-chip with the processor 1102. Alternatively, the cache memory 1104 and the processor 1102 may be packed together as a "processor module," with processor 1102 being referred to as the "processor core." Furthermore, certain embodiments of the present disclosure may neither require nor include all of the above components. For example, the peripheral devices shown coupled to the standard I/O bus 1108 may couple to the high performance I/O bus 1106. In addition, in some embodiments, only a single bus may exist, with the components of the hardware system 1100 being coupled to the single bus. Furthermore, the hardware system 1100 may include additional components, such as additional processors, storage devices, or memories.

An operating system manages and controls the operation of the hardware system 1100, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
receiving game events generated responsive to a player playing a game executing on a client device, wherein at least a portion of the received game events comprise a rigidly-timed sequence of multiple game events;
using the game events to build a player profile for the player, the player profile characterizing the game actions performed by the player;
comparing, by at least one processor, the player profile with a golden profile, the golden profile specifying an expected gaming behavior based on game events received from a plurality of players; and
based on the comparison between the player profile and the expected gaming behavior specified by the golden profile, marking a player account associated with the player as suspicious due to the rigidly-timed sequence of multiple game events.

2. The computer-implemented method of claim 1, wherein using the game events to build the player profile comprises tracking at least one of the following metrics: a rate of game activity, a pattern of game actions, a period of time per session, or an interval time between sessions.

3. The computer-implemented method of claim 1, wherein the player profile specifies a rate of change for a property of the game, the golden profile specifies an expected rate of change for the property of the game, and the comparing the player profile with the golden profile includes comparing the rate of change for the property of the game with the expected rate of change for the property of the game.

4. The computer-implemented method of claim 1, wherein the game events represent user initiated game actions performed on one or more client devices.

5. The computer-implemented method of claim 1, further comprising:
obtaining a social graph associated with the player, the social graph including a plurality of nodes that each represent a friend of the player;
comparing each node of the social graph with a shell account profile specified by the golden profile; and
based on the comparisons of each of the nodes from the social graph and the shell account profile, marking the player account associated with the player as is suspicious.

6. The computer-implemented method of claim 5, wherein the shell account profile specifies a social connection threshold.

7. The computer-implemented method of claim 5, wherein the shell account profile specifies a social activity threshold.

8. The computer-implemented method of claim 1, wherein the player profile specifies a session duration, the golden profile specifies an expected session duration, and the comparing the player profile with the golden profile includes comparing the session duration specified by the player profile with the with the expected session duration specified by the golden profile.

9. A computer system, comprising:
at least one processor; and
a thin gaming server implemented by the at least one processor and configured to:
receive game events generated responsive to a player playing a game executing on a client device, wherein at least a portion of the received game events comprise a rigidly-timed sequence of multiple game events;
use the game events to build a player profile for the player, the player profile characterizing the game actions performed by the player;
compare the player profile with a golden profile, the golden profile specifying an expected gaming behavior based on game events received from a plurality of players; and
based on the comparison between the player profile and the expected gaming behavior specified by the golden profile, mark a player account associated with the player as suspicious due to the rigidly-timed sequence of multiple game events.

10. The computer system of claim 9, wherein the thin gaming server is configured to use the game events to build the player profile by tracking at least one of the following metrics: a rate of game activity, a pattern of game actions, a period of time per session, or an interval time between sessions.

11. The computer system of claim 9, wherein the player profile specifies a rate of change for a property of the game, the golden profile specifies an expected rate of change for the property of the game, and the comparing the player profile with the golden profile includes comparing the rate of change for the property of the game with the expected rate of change for the property of the game.

12. The computer system of claim 9, wherein the game events represent user initiated game actions performed on one or more client devices.

13. The computer system of claim 9, wherein the thin gaming server is further configured to:
obtain a social graph associated with the player, the social graph including a plurality of nodes that each represent a friend of the player;
compare each node of the social graph with a shell account profile specified by the golden profile; and
based on the comparisons of each of the nodes from the social graph and the shell account profile, mark the player account associated with the player as suspicious.

14. The computer system of claim 13, wherein the shell account profile specifies a social connection threshold.

15. The computer system of claim 13, wherein the shell account profile specifies a social activity threshold.

16. The computer system of claim 9, wherein the player profile specifies a session duration, the golden profile specifies an expected session duration, and the comparing the player profile with the golden profile includes comparing the session duration specified by the player profile with the with the expected session duration specified by the golden profile.

17. A non-transitory computer-readable medium storing executable instructions thereon, which, when executed by a processor, cause the processor to perform operations comprising:
receiving game events generated responsive to a player playing a game executing on a client device, wherein at least a portion of the received game events comprise a rigidly-timed sequence of multiple game events;
using the game events to build a player profile for the player, the player profile characterizing the game actions performed by the player;
comparing, by at least one processor, the player profile with a golden profile, the golden profile specifying an expected gaming behavior based on game events received from a plurality of players; and
based on the comparison between the player profile and the expected gaming behavior specified by the golden profile, marking a player account associated with the player as suspicious due to the rigidly-timed sequence of multiple game events.

18. The non-transitory computer-readable medium of claim 17, wherein using the game events to build the player profile comprises tracking at least one of the following metrics: a rate of game activity, a pattern of game actions, a period of time per session, or an interval time between sessions.

19. The non-transitory computer-readable medium of claim 17, wherein the player profile specifies a rate of change for a property of the game, the golden profile specifies an expected rate of change for the property of the game, and the comparing the player profile with the golden profile includes comparing the rate of change for the property of the game with the expected rate of change for the property of the game.

20. The non-transitory computer-readable medium of claim 17, wherein the game events represent user initiated game actions performed on one or more client devices.

\* \* \* \* \*